US010623052B2

United States Patent
Ahn

(10) Patent No.: US 10,623,052 B2
(45) Date of Patent: Apr. 14, 2020

(54) RECEIVER AND COMPENSATION METHOD USING THE SAME

(71) Applicant: Samsung Display Co., Ltd., Yongin-si, Gyeonggi-do (KR)

(72) Inventor: Jeong Keun Ahn, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 156 days.

(21) Appl. No.: 15/973,893

(22) Filed: May 8, 2018

(65) Prior Publication Data

US 2019/0074863 A1    Mar. 7, 2019

(30) Foreign Application Priority Data

Sep. 7, 2017 (KR) ........................ 10-2017-0114656

(51) Int. Cl.
*H04B 3/32* (2006.01)
*H04B 1/16* (2006.01)

(52) U.S. Cl.
CPC ................. *H04B 3/32* (2013.01); *H04B 1/16* (2013.01)

(58) Field of Classification Search
None
See application file for complete search history.

(56) References Cited

U.S. PATENT DOCUMENTS

| | | | |
|---|---|---|---|
| 9,515,031 B2 | 12/2016 | Altunyurt et al. | |
| 10,256,968 B1 * | 4/2019 | Wu | H04L 7/0025 |
| 2001/0001616 A1 * | 5/2001 | Rakib | H03M 13/256 |
| | | | 375/259 |
| 2005/0135523 A1 * | 6/2005 | Carballo | H03L 7/0802 |
| | | | 375/354 |
| 2005/0259692 A1 * | 11/2005 | Zerbe | H04L 25/14 |
| | | | 370/503 |
| 2008/0175343 A1 * | 7/2008 | Nakayama | G06F 1/10 |
| | | | 375/373 |
| 2010/0135358 A1 * | 6/2010 | McCorkle | G01S 7/023 |
| | | | 375/130 |
| 2010/0322367 A1 * | 12/2010 | Wenske | H03L 7/0807 |
| | | | 375/373 |

(Continued)

OTHER PUBLICATIONS

Jung, Hae-Kang et al., "A 4 Gb/s 3-bit Parallel Transmitter With the Crosstalk-Induced Jitter Compensation Using TX Data Timing Control", IEEE Journal of Solid-State Circuits, vol. 44, No. 11, Nov. 2009, pp. 2891-2900.

*Primary Examiner* — Otis L Thompson, Jr.
(74) *Attorney, Agent, or Firm* — Lewis Roca Rothgerber Christie LLP

(57) ABSTRACT

Provided herein may be a receiver and a compensation method using the same. The receiver may be coupled to a transmitter through a plurality of channels, and may include a decoder configured to sample a received signal of a corresponding channel of the channels at a sampling point, and a controller configured to provide to the decoder a sampling clock signal for determining the sampling point, measure a level of the received signal having a transition direction that is identical to that of an adjacent received signal of an adjacent channel of the channels at the sampling point, during a compensation period, and adjust a phase of the sampling clock signal such that the measured level is at an intermediate level among variable levels of the received signal, during the compensation period.

17 Claims, 9 Drawing Sheets

(56) References Cited

U.S. PATENT DOCUMENTS

| | | | |
|---|---|---|---|
| 2012/0069875 A1* | 3/2012 | Konishi | H04L 1/203 375/219 |
| 2012/0242382 A1* | 9/2012 | Tsuchiya | H03L 7/00 327/153 |
| 2016/0301522 A1* | 10/2016 | Tetzlaff | H04L 1/00 |
| 2017/0134189 A1* | 5/2017 | Sadeghi-Emamchaie | H04L 27/2627 |

* cited by examiner

| | Odd Mode | Even Mode | Static Mode |
|---|---|---|---|
| CH1 | ⎡⎤ OR ⎤⎦ | ⎡⎤ OR ⎤⎦ | — OR — |
| CH2 | ⎤⎦ OR ⎡⎤ | ⎡⎤ OR ⎤⎦ | ⎡⎤ OR ⎤⎦ |

FIG. 8
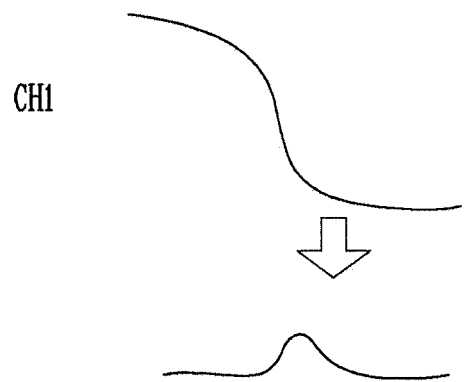
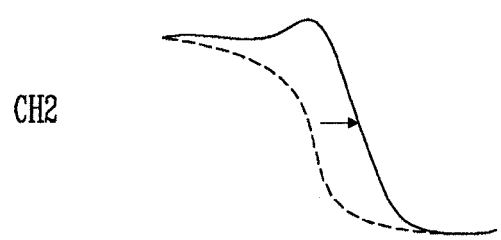
FIG. 9
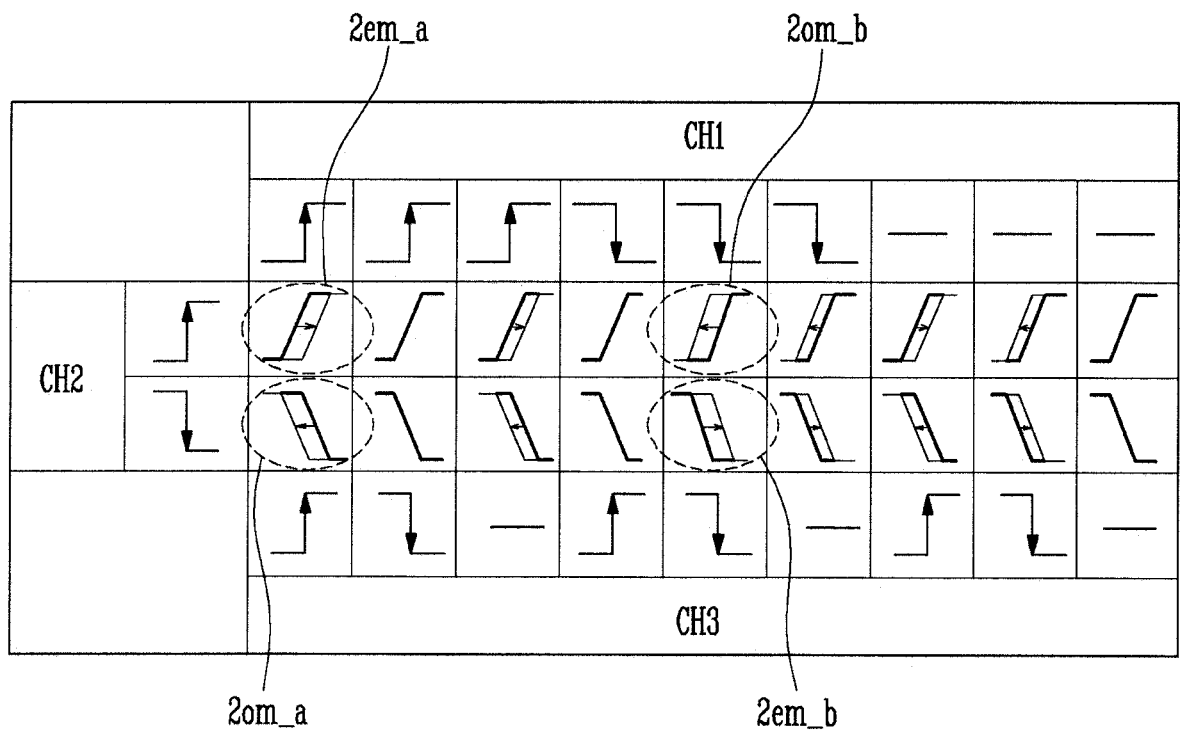

RECEIVER AND COMPENSATION METHOD USING THE SAME

CROSS-REFERENCE TO RELATED APPLICATION

This application claims priority to, and the benefit of, Korean patent application number 10-2017-0114656 filed on Sep. 7, 2017, the entire disclosure of which is incorporated herein in its entirety by reference.

BACKGROUND

1. Field

Various embodiments of the present disclosure relate to a receiver, and to a compensation method using the receiver.

2. Related Art

In a transmission/reception system in which a transmitter and a receiver are coupled to each other through a single channel, major noise that causes degradation of signal quality is referred to as inter-symbol interference (ISI), and a lot of solutions to such ISI have been presented.

However, in a high-speed parallel link system in which a transmitter and a receiver are coupled through a plurality of channels, crosstalk-induced jitter (CIJ), together with inter-symbol interference (ISI), is also caused. Unlike ISI, useful solutions to crosstalk-induced jitter (CIJ) have not yet been presented for certain scenarios.

There are efforts to reduce the influence of crosstalk by physically increasing an interval between channels, or by reducing the length of each channel itself on a printed circuit board. However, such methods are problematic in that, as the number of links is larger, the size of a printed circuit board is sharply increased, thus increasing costs.

SUMMARY

Various embodiments of the present disclosure are directed to a receiver and to a compensation method using the receiver, which may minimize the influence of crosstalk-induced jitter at a receiving stage.

An embodiment of the present disclosure may provide for a receiver coupled to a transmitter through a plurality of channels, the receiver including a decoder configured to sample a received signal of a corresponding channel of the channels at a sampling point, and a controller configured to provide to the decoder a sampling clock signal for determining the sampling point, measure a level of the received signal having a transition direction that is identical to that of an adjacent received signal of an adjacent channel of the channels at the sampling point, during a compensation period, and adjust a phase of the sampling clock signal such that the measured level is at an intermediate level among variable levels of the received signal, during the compensation period.

The controller may be further configured to, during the compensation period, measure the level of the received signal having a first transition direction that is identical to that of the adjacent received signal of the adjacent channel at the sampling point, store a phase of the sampling clock signal, which appears when the measured level is the intermediate level, as a first phase, measure the level of the received signal having a second transition direction that is identical to that of the adjacent received signal of the adjacent channel at the sampling point, store a phase of the sampling clock signal, which appears when the measured level is the intermediate level, as a second phase, and use either the first phase or the second phase that has a larger magnitude as the phase of the sampling clock signal.

The first transition direction and the second transition direction may be different from each other.

The adjacent channel may be one of two adjacent channels that are most adjacent to the corresponding channel, and, during the compensation period, adjacent received signals having an identical transition direction may be simultaneously applied to the two adjacent channels.

The decoder may include a first comparator configured to provide a logic value by comparing the received signal with a first reference voltage in response to the sampling clock signal, a second comparator configured to provide a logic value by comparing the received signal with a second reference voltage in response to the sampling clock signal, and a multiplexer configured to output one of the logic values provided by the first comparator and the second comparator as current data.

The multiplexer may be configured to select one of the logic values provided by the first comparator and the second comparator based on previous data occurring one unit interval (1 UI) before the current data, and output the selected one of the logic values as the current data.

The first reference voltage may have an intermediate value that is between the intermediate level and a highest level among the variable levels of the received signal, and the second reference voltage may have an intermediate value that is between the intermediate level and a lowest level among the variable levels of the received signal.

The first comparator may be configured to when the received signal is higher than the first reference voltage, provide a high-level logic value, and when the received signal is lower than the first reference voltage, provide a low-level logic value, and wherein the second comparator is configured to when the received signal is higher than the second reference voltage, provide a high-level logic value, and when the received signal is lower than the second reference voltage, provide a low-level logic value.

When an output value of the multiplexer is a high-level logic value, a binary level of the current data may be 1, and, when the output value of the multiplexer is a low-level logic value, a binary level of the current data may be 0.

The received signal may be a duo-binary signal.

Each of the plurality of channels may be designed as a low-pass filter.

An embodiment of the present disclosure may provide for a compensation method performed using a decoder and a controller in a receiver that is coupled to a transmitter through a plurality of channels, the compensation method including measuring a level of a received signal of a corresponding channel of the channels having a transition direction that is identical to that of an adjacent received signal of an adjacent channel of the channels at a sampling point, and adjusting a phase of a sampling clock signal for determining the sampling point such that the measured level is an intermediate level among variable levels of the received signal.

The adjacent channel may be one of two adjacent channels of the channels that are most adjacent to a channel to which the received signal is applied, and adjacent received signals, which include the adjacent received signal, may have an identical transition direction and are simultaneously applied to the two adjacent channels.

The received signal may be a duo-binary signal.

Each of the plurality of channels may be designed as a low-pass filter.

An embodiment of the present disclosure may provide for a compensation method performed using a decoder and a controller in a receiver that is coupled to a transmitter through a plurality of channels, the compensation method including measuring a level of a received signal of a corresponding channel of the channels having a first transition direction that is identical to that of an adjacent received signal of an adjacent channel of the channels at a sampling point, storing, as a first phase, a phase of a sampling clock signal for determining the sampling point such that the measured level is an intermediate level among variable levels of the received signal, measuring a level of the received signal having a second transition direction that is identical to that of the adjacent received signal of the adjacent channel at the sampling point, storing, as a second phase, a phase of the sampling clock signal appearing when the measured level is the intermediate level, and using the first phase or the second phase having a larger magnitude as the phase of the sampling clock signal.

The first transition direction and the second transition direction may be different from each other.

BRIEF DESCRIPTION OF THE DRAWINGS

FIG. 8 is a diagram illustrating an example of crosstalk-induced jitter caused by an adjacent received signal.

FIG. 9 is a diagram for explaining crosstalk-induced jitter depending on a relationship between adjacent received signals of two adjacent channels and a received signal of the corresponding channel.

DETAILED DESCRIPTION

Figure 1:
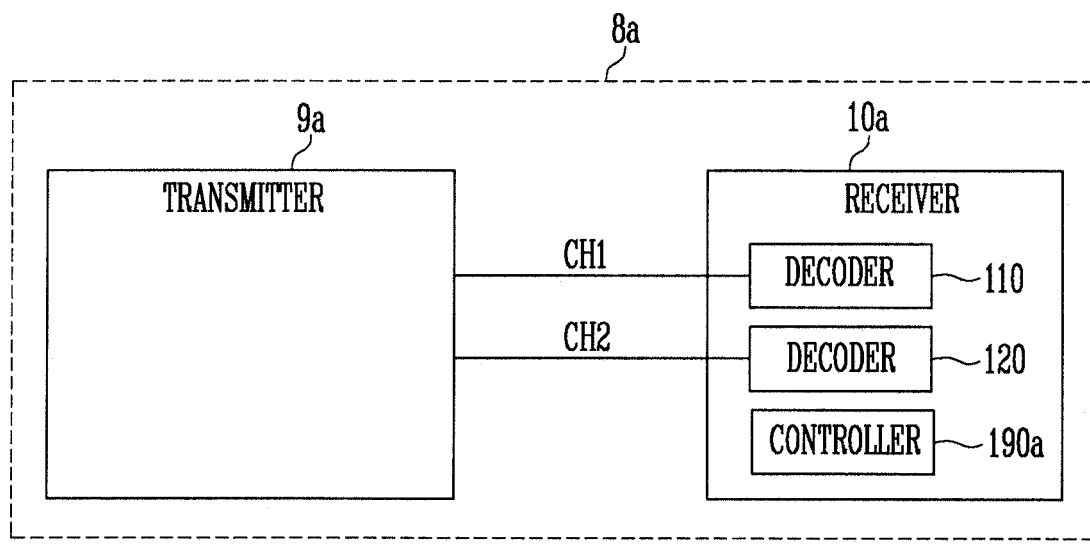
FIG. 1 is a diagram illustrating a receiver according to an embodiment of the present disclosure.

Features of the inventive concept and methods of accomplishing the same may be understood more readily by reference to the following detailed description of embodiments and the accompanying drawings. Hereinafter, embodiments will be described in more detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component.

Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a diagram illustrating a receiver according to an embodiment of the present disclosure.

Referring to FIG. 1, a receiver 10a according to an embodiment of the present disclosure includes decoders 110 and 120 and a controller 190a.

A transmitter 9a is coupled to the receiver 10a through a plurality of channels CH1 and CH2. The transmitter 9a and the receiver 10a may be independent products. The transmitter 9a and the receiver 10a may constitute a transmission/reception system 8a in a single product.

For example, the transmission/reception system 8a may be a memory system, wherein the plurality of channels CH1 and CH2 may be memory buses, and the transmitter 9a and the receiver 10a may be controller-side or memory-side transmitter and receiver, respectively. Here, the memory may be a frame memory of a display device, such as a liquid crystal display (LCD) or an organic light emitting display (OLED). The frame memory may be used as a frame buffer in the display device, and may store pixel data of a specific frame.

However, the receiver 10a in the present embodiment is not necessarily applied to a memory system, but may be applied to any type of field related to parallel link systems in which the receiver is coupled to a transmitter through a plurality of channels.

The decoders 110 and 120 are configured to sample received signals of the corresponding channels CH1 and CH2 at a sampling point. Detailed configurations of the decoders 110 and 120 will be described later with reference to FIG. 5.

The controller 190a provides the decoders 110 and 120 with a sampling clock signal for deciding on, or for determining, the sampling point. The controller 190a adjusts the phase of the sampling clock signal in a compensation period, and uses the phase-adjusted sampling clock signal in a driving period, thus reducing or minimizing the influence of crosstalk-induced jitter. In accordance with an embodiment, the controller 190a may provide a plurality of sampling clock signals that are independently adjusted and that correspond to the decoders 110 and 120.

Hereinafter, for convenience of description, the corresponding channel is defined as "channel CH2," and the adjacent channel is defined as "channel CH1." Therefore, a target decoder to be described is the decoder 120. When the corresponding channel is CH1, the adjacent channel may be CH2, and the target decoder to be described may be the decoder 110, but a repeated detailed description thereof will be omitted.

In detail, in a compensation period, the controller 190a may measure the level of the received signal of the corresponding channel CH2 having the same transition direction as the adjacent received signal of the adjacent channel CH1 at the sampling point, and may adjust the phase of the sampling clock signal so that the measured level is an intermediate level among variable levels of the received signal. The effect of such control will be described in detail later with reference to FIGS. 10 and 11. A mode in which the received signal has the same transition direction as the adjacent received signal may be referred to as an "even mode."

In accordance with other embodiments, in a compensation period, the controller 190a may measure the level of a received signal having the same first transition direction as an adjacent received signal of an adjacent channel CH1 at a sampling point, may store the phase of the sampling clock signal, which appears when the measured level becomes an intermediate level, as a first phase, may measure the level of the received signal having the same second transition direction as the adjacent received signal of the adjacent channel CH1 at the sampling point, may store the phase of the sampling clock signal, which appears when the measured level becomes an intermediate level, as a second phase, and may use between the first phase and the second phase having a larger magnitude as the phase of the sampling clock signal. Here, the first transition direction and the second transition direction may be different from each other.

For example, when the magnitude of the first phase is larger, even if the phase of the sampling clock signal is adjusted in accordance with the first phase, a voltage sampled for the second transition direction may also secure a sufficient margin from a reference voltage that is a comparative target. An additional description thereof will be made in detail later with reference to FIGS. 10 and 11.

Figure 2:
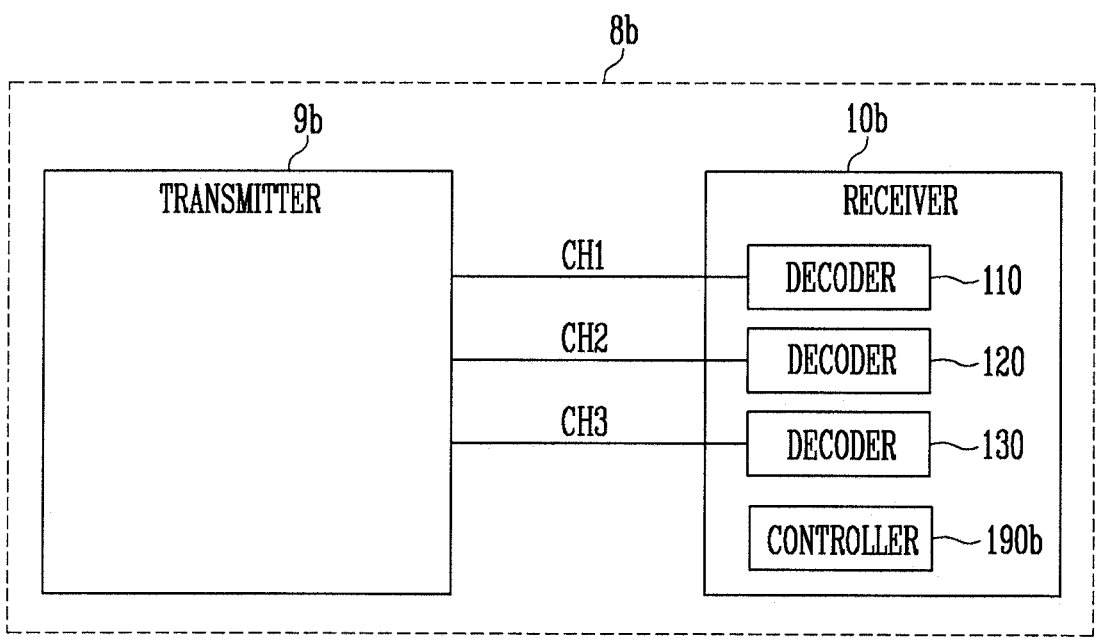
FIG. 2 is a diagram illustrating a receiver according to an embodiment of the present disclosure.

FIG. 2 is a diagram illustrating a receiver according to an embodiment of the present disclosure.

Referring to FIG. 2, a receiver 10b according to an embodiment of the present disclosure includes decoders 110, 120, and 130 and a controller 190b. A transmitter 9b may be coupled to the receiver 10b through a plurality of channels CH1, CH2, and CH3, and the transmitter 9b and the receiver 10b may constitute a transmission/reception system 8b.

The receiver 10b of FIG. 2 is different from the receiver 10a of FIG. 1 in that the receiver 10b further includes decoder 130.

Here, adjacent channels may be two channels CH1 and CH3 that are most adjacent to the corresponding channel CH2, and adjacent received signals having the same transition direction may be simultaneously applied to the two adjacent channels CH1 and CH3 in a compensation mode. This mode may be referred to as a "2-even mode."

As illustrated in FIG. 2, even if the receiver has three channels CH1, CH2, and CH3, a compensation method, such as that of the embodiment in FIG. 1, may be implemented for border channels. That is, when the corresponding channel is the channel CH1, an adjacent channel may be the channel CH2. Further, when the corresponding channel is the channel CH3, an adjacent channel may be the channel CH2.

When the embodiments of FIGS. 1 and 2 are combined with each other, the embodiment of the present disclosure may be applied to any receiver coupled to the transmitter through n channels, n being a natural number. The compensation method for border channels may be performed via the embodiment of FIG. 1, and the compensation method for non-border channels (e.g., channels other than the border channels) may be performed via the embodiment of FIG. 2. In other examples, the compensation method for all channels may be performed via the embodiment of FIG. 2.

In the compensation period, the controller 190b may measure the level of a received signal of the corresponding channel CH2 having the same transition direction as adjacent received signals of the adjacent channels CH1 and CH3 at a sampling point, and may adjust the phase of a sampling clock signal so that the measured level is an intermediate level among variable levels of the received signal.

According to other embodiments, in the compensation period, the controller 190b may measure the level of a received signal having the same first transition direction as adjacent received signals of adjacent channels CH1 and CH3 at a sampling point, may store the phase of the sampling clock signal, which appears when the measured level becomes an intermediate level, as a first phase, may measure the level of the received signal having the same second transition direction as the adjacent received signals of the adjacent channels CH1 and CH3 at the sampling point, may store the phase of the sampling clock signal, which appears when the measured level becomes an intermediate level, as a second phase, and may use the phase that has a larger magnitude between the first phase and the second phase as the phase of the sampling clock signal. Here, the first transition direction and the second transition direction may be different from each other.

Figure 3:
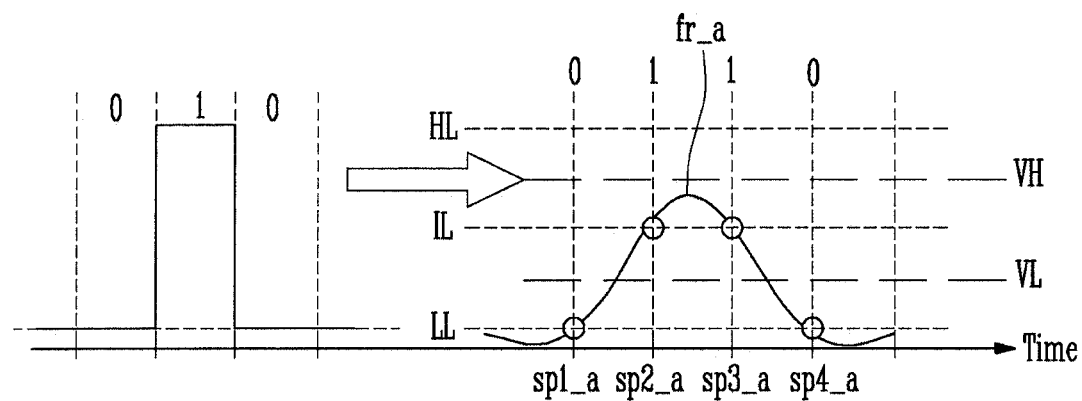
FIG. 3 is a diagram illustrating a received signal corresponding to one transmission signal.
Figure 4:
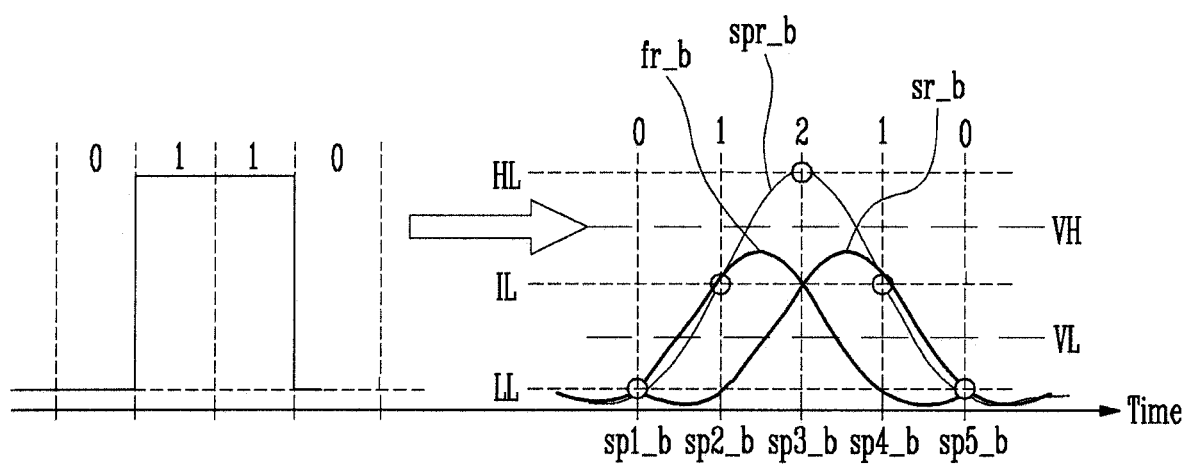
FIG. 4 is a diagram illustrating a received signal corresponding to another transmission signal.

FIG. 3 is a diagram illustrating a received signal corresponding to one transmission signal, and FIG. 4 is a diagram illustrating a received signal corresponding to another transmission signal.

In FIGS. 3 and 4, it is assumed that crosstalk-induced jitter is not present. In FIGS. 3 and 4, an interval between adjacent sampling points is 1 unit interval (UI).

In FIGS. 3 and 4, the variable level of a received signal may be any level falling within a range from a lowest level (LL) to a highest level (HL). An intermediate level (IL) is present between the lowest level (LL) and the highest level (HL).

Referring to FIG. 3, when a transmitter 9a or 9b transmits a transmission signal having binary levels of 0, 1, 0 through any channel, a received signal fr_a, which is received by a receiver 10a or 10b after having passed through the channel, is exemplarily illustrated. Remaining data of the transmission signal, not illustrated in FIG. 3, is assumed to have a binary level "0."

The format of the received signal fr_a, such as that illustrated in FIG. 3, may be acquired when each channel is designed as a low-pass filter. Therefore, in accordance with an embodiment, each of a plurality of channels used to couple the transmitter 9a or 9b and the receiver 10a or 10b may be designed as a low-pass filter.

A received signal conforming to a response format, such as that illustrated in FIG. 3, may be referred to as a "duo-binary signal." In addition to a case where the channel is designed as a low-pass filter, even in a case where the transmitter 9a or 9b is equipped with an encoder for duo-binary signaling, the response format, such as that illustrated in FIG. 3, may appear. Because the embodiment of the present disclosure relates to the receiver 10a or 10b and to the compensation method performed by the receiver 10a or 10b, a detailed description of the configuration of the transmitter 9a or 9b will be omitted.

There are various duo-binary signaling methods, but, in general, in the case of the received signal fr_a in FIG. 3, a cursor (e.g., a sampling value) of a sampling point sp1_a may be a pre-cursor, a cursor of a sampling point sp2_a may be a main cursor, a cursor of a sampling point sp3_a may be a first (1st) post-cursor, and a cursor of a sampling point sp4_a may be a second (2nd) post-cursor. Various well-known methods may be used such that the levels (magnitudes) of the main cursor and the first post-cursor are identical or substantially identical to each other in order to suitably apply duo-binary signaling.

Referring to FIG. 4, when the transmitter 9a or 9b transmits a transmission signal having binary levels of 0, 1, 1, 0 through any one channel, a received signal spr_b, which is received by the receiver 10a or 10b after having passed through the channel, is exemplarily illustrated. Remaining data of the transmission signal that is not illustrated in FIG. 4 is assumed to have a binary level "0."

In FIG. 4, the received signal spr_b may be considered to be a signal in which a response signal fr_b corresponding to a first binary level "1" overlaps a response signal sr_b corresponding to a second binary level "1." In general, in the case of the response signal fr_b, a cursor of a sampling point sp1_b may be a pre-cursor, a cursor of a sampling point sp2_b may be a main cursor, a cursor of a sampling point sp3_b may be a first post-cursor, and a cursor of a sampling point sp4_b may be a second post-cursor. In general, in the case of the response signal sr_b, the cursor of the sampling point sp2_b may be a pre-cursor, the cursor of the sampling point sp3_b may be a main cursor, the cursor of the sampling point sp4_b may be a first post-cursor, and a cursor of a sampling point sp5_b may be a second post-cursor.

Hereinafter, a method of decoding a duo-binary signal will be described in detail with reference to FIGS. 3 and 4.

When decoding of the duo-binary signal is performed, a decision value for previous data before a 1 UI may be required. When the decision value for previous data before a 1 UI is 1, a first reference voltage VH may be used to decide on current data. Further, when the decision value for previous data before a 1 UI is 0, a second reference voltage VL may be used to decide on current data. The first reference voltage VH may have an intermediate value between the highest level (HL) and the intermediate level (IL) among the variable levels of the received signal. The second reference voltage VL may have an intermediate value between the lowest level (LL) and the intermediate level (IL) among the variable levels of the received signal.

For example, referring to FIG. 3, at the sampling point sp2_a, a decision value for previous data before a 1 UI is 0, and thus the binary level of current data may be decided based on the second reference voltage VL. The level of the received signal sampled at the sampling point sp2_a is the intermediate level (IL), which is higher than the second reference voltage VL, and thus the binary level of the current data may be determined as "1."

Next, referring to FIG. 3, at the sampling point sp3_a, a decision value for previous data before a 1 UI is 1, and thus the binary level of current data may be decided based on the first reference voltage VH. The level of the received signal sampled at the sampling point sp3_a is the intermediate level (IL), which is lower than the first reference voltage VH, and thus the binary level of the current data may be determined as "0."

In an example, referring to FIG. 4, at the sampling point sp2_b a decision value for previous data before a 1 UI is 0, and thus the binary level of current data may be decided based on the second reference voltage VL. The level of the received signal sampled at the sampling point sp2_b is the intermediate level (IL), which is higher than the second reference voltage VL, and thus the binary level of the current data may be determined as "1."

Next, referring to FIG. 4, at the sampling point sp3_b, a decision value for previous data before a 1 UI is 1, and thus the binary level of current data may be decided based on the first reference voltage VH. The level of the received signal sampled at the sampling point sp3_b is the highest level (HL), which is higher than the first reference voltage VH, and thus the binary level of the current data may be determined as "1."

Then, referring to FIG. 4, at the sampling point sp4_b, a decision value for previous data before a 1 UI is 1, and thus the binary level of current data may be decided based on the first reference voltage VH. Because the level of the received signal sampled at the sampling point sp4_b is the intermediate level (IL), which is lower than the first reference voltage VH, and thus the binary level of the current data may be determined as "0."

Figure 5:
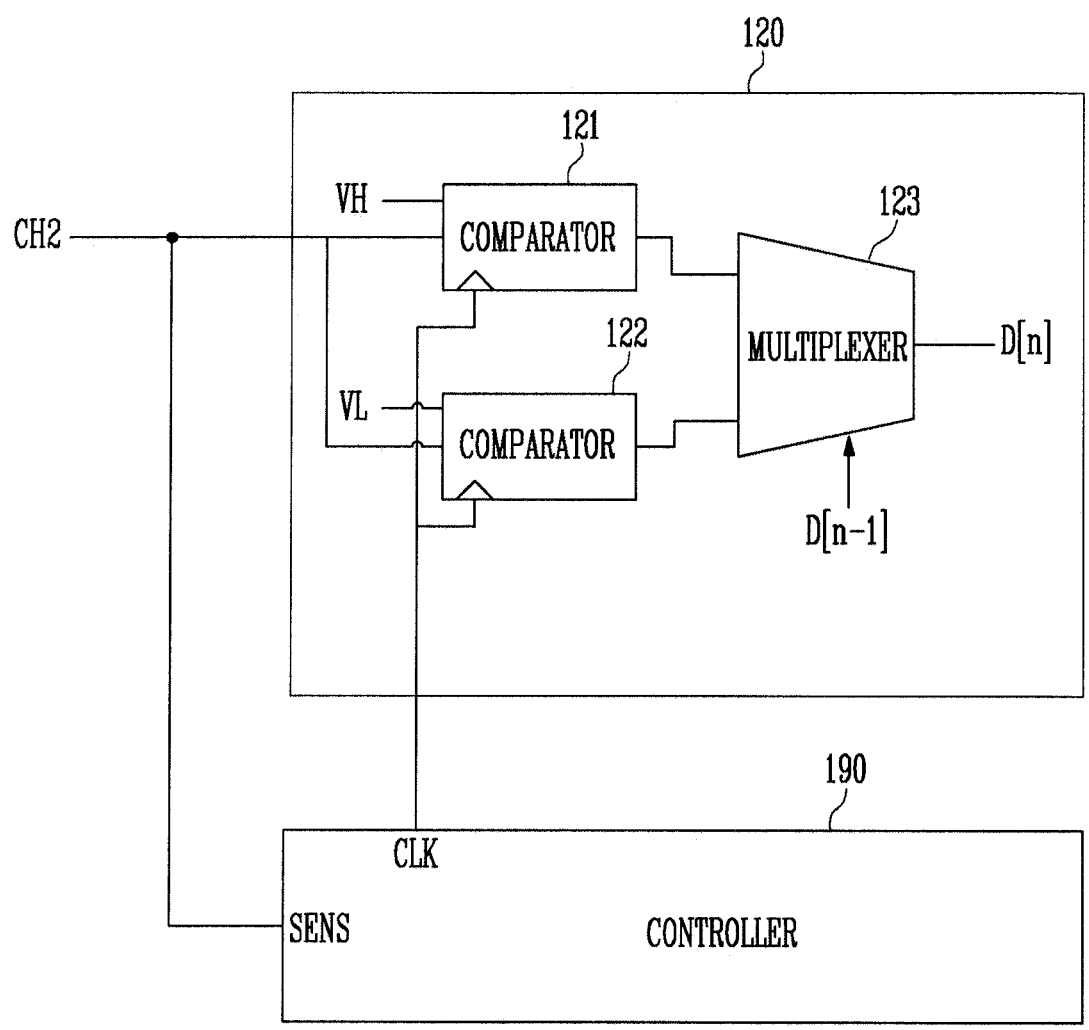
FIG. 5 is a diagram illustrating a decoder and a controller according to an embodiment of the present disclosure.

The above description is embodied into a decoder 120 in FIG. 5 according to one embodiment.

FIG. 5 is a diagram for explaining a decoder and a controller according to an embodiment of the present disclosure. Although the decoder 120 has been illustrated based on a channel CH2 in FIG. 5, the same description may also be applied to other channels and other decoders. The configuration of the controller 190 of FIG. 5 may also be applied to controllers 190a and 190b in the same way.

Referring to FIG. 5, the decoder 120 may include a first comparator 121, a second comparator 122, and a multiplexer 123.

The first comparator 121 may provide a logic value by comparing a received signal with a first reference voltage VH in response to a sampling clock signal CLK. The received signal may be received through a channel CH2. The first comparator 121 may be operated in response to a rising transition or a falling transition of the sampling clock signal CLK, and may then sample the level of the received signal at the sampling point thereof and compare the sampled level with the first reference voltage VH. When the level of the received signal is higher than the first reference voltage VH, the first comparator 121 may provide a high-level logic value, whereas when the level of the received signal is lower than the first reference voltage VH, the first comparator 121 may provide a low-level logic value.

The second comparator 122 may provide a logic value by comparing the received signal with the second reference voltage VL in response to the sampling clock signal CLK. The received signal may be received through the channel CH2. The second comparator 122 may be operated in response to a rising transition or a falling transition of the sampling clock signal CLK, and may then sample the level of the received signal at the sampling point of the received signal and compare the sampled level with the second reference voltage VL. When the level of the received signal is higher than the second reference voltage VL, the second comparator 122 may provide a high-level logic value, whereas when the level of the received signal is lower than the second reference voltage VL, the second comparator 122 may provide a low-level logic value.

The multiplexer 123 may output any one of the output values of the first comparator 121 and the second comparator 122 as current data D[n]. The multiplexer 123 may select one of the output values of the first comparator 121 and the second comparator 122 based on previous data D[n−1] from 1 UI prior, and may output the selected output value as the current data D[n]. In detail, when the previous data D[n−1] has a binary level "1," the multiplexer 123 may output the output value of the first comparator 121 as the current data D[n]. In contrast, when the previous data D[n−1] has a binary level "0," the multiplexer 123 may output the output value of the second comparator 122 as the current data D[n]. When the output value of the multiplexer 123 is a high-level logic value, the binary level of the current data D[n] may be 1, whereas when the output value of the multiplexer 123 is a low-level logic value, the binary level of the current data D[n] may be 0.

The controller 190 may output the sampling clock signal CLK. Further, the controller 190 may measure the level of the received signal of the channel CH2 through a terminal SENS.

Figures 6, 7:
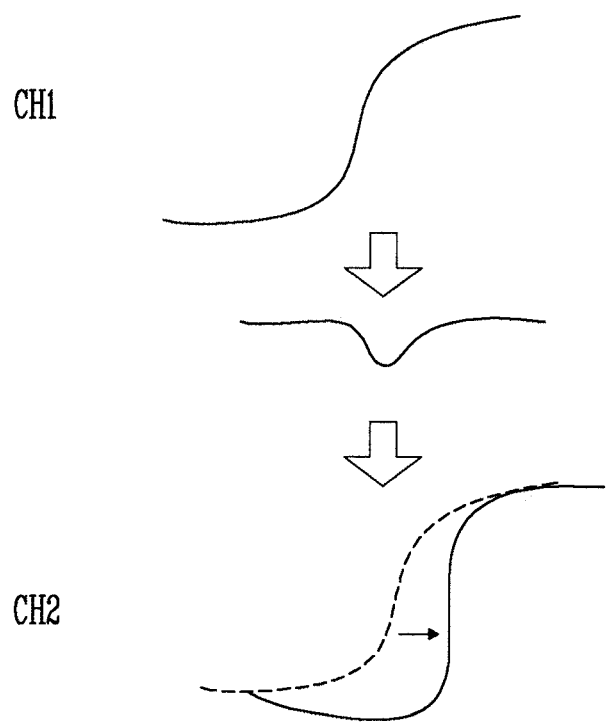
FIG. 6 is a diagram illustrating a mode depending on a relationship between an adjacent received signal of an adjacent channel and a received signal of the corresponding channel.
FIG. 7 is a diagram for explaining crosstalk-induced jitter caused by an adjacent received signal.

FIG. 6 is a diagram illustrating a mode depending on a relationship between an adjacent received signal of an adjacent channel and a received signal of the corresponding channel.

A description will be made with reference to FIG. 6 together with FIG. 1.

When crosstalk-induced jitter is described, a target channel is referred to as a "victim channel," and an adjacent channel that badly influences the victim channel is referred to as an "aggressor channel." In the present embodiment, a channel that is a victim channel/target channel is defined as channel CH2. At this time, the aggressor channel may be channel CH1.

On the other hand, when crosstalk-induced jitter, which is induced from the channel CH2, may badly influence the channel CH1, and such bad influence may return to, or reflect back to, the channel CH2. However, in this case, the influence is relatively insignificant, but a description thereof may be excessively complicated, and thus the description thereof will be omitted.

A case where transition directions of the victim channel CH2 and the aggressor channel CH1 are different from each other is referred to as an "odd mode." As illustrated in FIG. 6, there may be two types of cases.

A case where the transition directions of the victim channel CH2 and the aggressor channel CH1 are identical to each other is referred to as an "even mode." As illustrated in FIG. 6, there may be two types of cases of transitions (e.g., a rising transition and a falling transition).

In contrast, a case where the aggressor channel CH1 does not have a transition regardless of the transition direction of the victim channel CH2 is referred to as a "static mode." As illustrated in FIG. 6, there may be two types of cases.

FIG. 7 is a diagram for explaining crosstalk-induced jitter caused by an adjacent received signal, and FIG. 8 is a diagram illustrating an example of crosstalk-induced jitter caused by an adjacent received signal.

Referring to FIG. 7, an even mode in which both a victim channel CH2 and an aggressor channel CH1 make a rising transition is illustrated.

When a rising transition is made on the aggressor channel CH1, a voltage drop occurs on the victim channel CH2 in a downward direction, which is opposite to the direction of the rising transition, due to mutual inductance between the two channels CH1 and CH2.

Therefore, in order for the voltage of the victim channel CH2 to again increase, an amount of time is additionally required. A delay having occurred in this way is crosstalk-induced jitter in the even mode.

Referring to FIG. 8, an even mode in which both a victim channel CH2 and an aggressor channel CH1 make a falling transition is illustrated.

When a falling transition is made on the aggressor channel CH1, a voltage rise occurs on the victim channel CH2 in an upward direction, which is opposite to the direction of the falling transition due to mutual inductance between the two channels CH1 and CH2.

Therefore, in order for the voltage of the victim channel CH2 to again decrease, an amount of time may be additionally required, and thus a delay occurring in this way is crosstalk-induced jitter in the even mode.

Consequently, in the even mode, crosstalk-induced jitter occurs in which the received signal of the victim channel CH2 is delayed regardless of the transition direction thereof.

In the case of the odd mode, crosstalk-induced jitter in a direction opposite to that of the even mode may occur, and a detailed description thereof will be omitted. For reference, in a static mode, crosstalk-induced jitter does not occur.

FIG. 9 is a diagram for explaining crosstalk-induced jitter depending on a relationship between adjacent received signals of two adjacent channels and a received signal of the corresponding channel.

A description will be made with reference to FIG. 9 together with FIG. 2. In the present embodiment, a target channel that is a victim channel is defined as channel CH2. Here, aggressor channels are the channels CH1 and CH3.

Meanwhile, crosstalk-induced jitter, which is induced from the channel CH2, may badly influence the channels CH1 and CH3, and such bad influence may return to the channel CH2. However, in this case, the influence is relatively insignificant, and a description thereof may be excessively complicated, and thus will be omitted.

A case where transition directions of two aggressor channels CH1 and CH3 adjacent to the victim channel CH2 are identical to each other is referred to as a "2-even mode." As illustrated in FIG. 9, there may be two types of 2-even mode cases (e.g., a case 2em_a where all signals on the channels CH1, CH2, and CH3 make a rising transition, and a case 2em_b where all signals on the channels CH1, CH2, and CH3 make a falling transition).

Referring to FIG. 9, it can be seen that, when a transition is made in the same direction on the two aggressor channels CH1 and CH3, the largest degree of crosstalk-induced jitter may occur. Further, when a transition is made only on a single aggressor channel, smaller crosstalk-induced jitter may occur. Furthermore, when transitions are made in opposite directions on the two aggressor channels CH1 and CH3, they may cancel each other, and thus crosstalk-induced jitter might not occur to a significant extent.

A case where the transition directions of two adjacent aggressor channels CH1 and CH3 are identical to each other, but are opposite to the transition direction of the victim channel CH2 is referred to as a "2-odd mode." Referring to FIG. 9, two types of 2-odd mode cases 2om_a and 2om_b are illustrated. In this case, the direction of crosstalk-induced jitter becomes opposite to that of the 2-even mode.

A case where no transition is made on two adjacent aggressor channels CH1 and CH3 is referred to as a "static mode."

Figure 10:
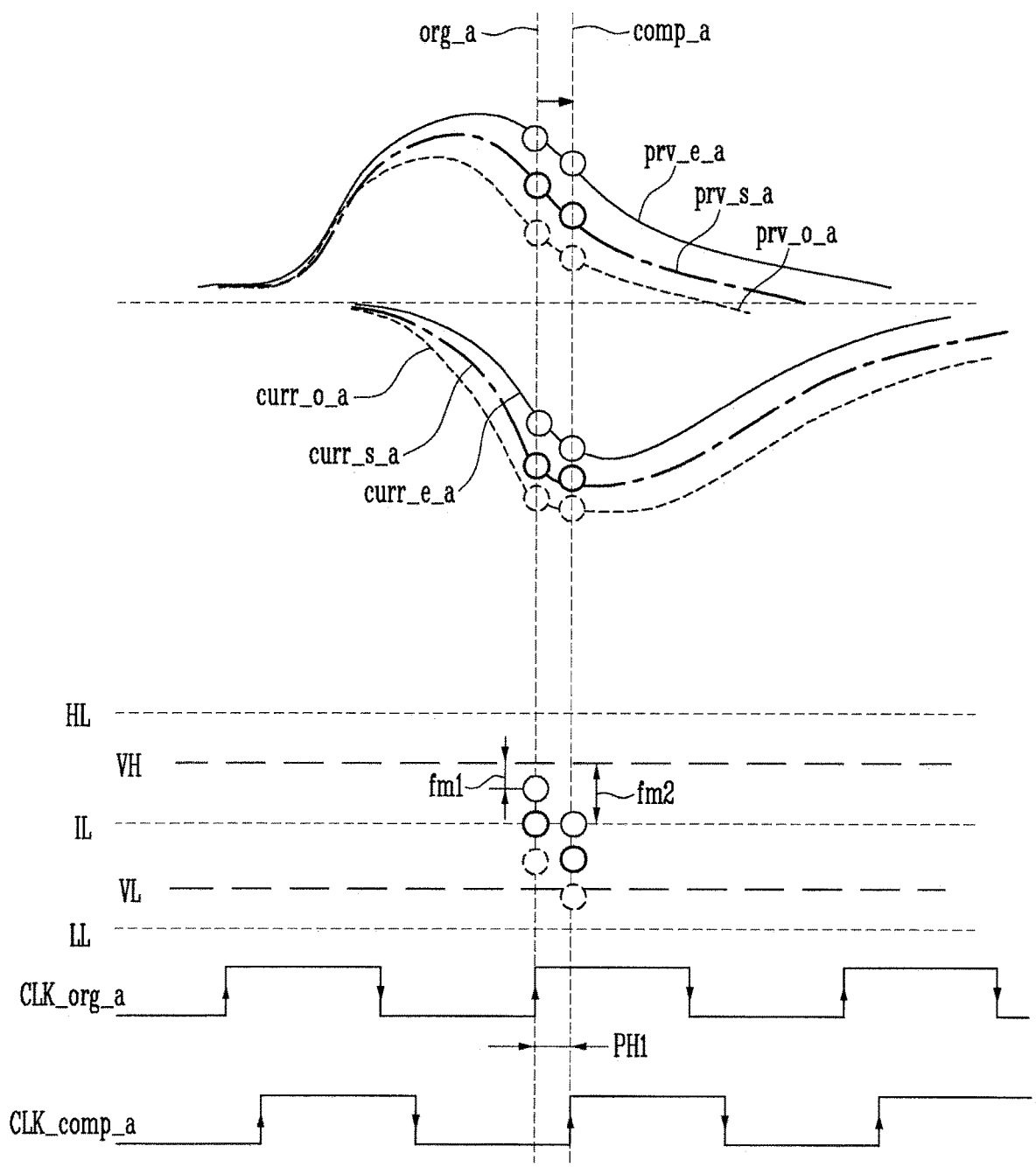
FIG. 10 is a diagram illustrating an effect that is obtained when the phase of a sampling clock signal is changed, according to an embodiment of the present disclosure.

FIG. 10 is a diagram illustrating an effect that is obtained when the phase of a sampling clock signal is changed, according to an embodiment of the present disclosure.

In order to describe this effect, referring back to FIGS. 3 and 4, features of the following duo-binary signaling may be known. Both in a rising transition in which a binary level makes a transition from 0 to 1, and in a falling transition in which a binary level makes a transition from 1 to 0, the level of a sampled received signal becomes an intermediate level (IL).

For example, referring to the transmission signal of FIG. 3, the binary level of the transmission signal makes a rising transition from 0 to 1, and thereafter immediately makes a falling transition from 1 to 0. In this case, referring to the received signal fr_a of FIG. 3, both the levels of the received signal sampled at sampling points sp2_a and sp3_a corresponding to respective transitions are at the intermediate level (IL).

For example, referring to the transmission signal of FIG. 4, a binary level makes a rising transition from 0 to 1, is maintained at 1 for a 1 UI, and then makes a falling transition from 1 to 0. Here, referring to the received signal spr_b of FIG. 4, both the levels of the received signal sampled at sampling points sp2_b and sp4_b corresponding to respective transitions are at the intermediate level (IL).

In the present embodiment, crosstalk-induced jitter may be compensated for based on the features of such duo-binary signaling.

Referring back to FIG. 10, a case where a previous signal (e.g., a signal that is 1 UI prior to a current signal) has a binary level "1," and where a current signal has a binary level "0," is conceptually illustrated. That is, the case of FIG. 10 indicates a falling transition. Signals illustrated in FIG. 10 are not actual signals, and responses to respective pieces of binary data are conceptually separated and exaggeratedly illustrated for easy understanding. For example, a sampling point org_a of FIG. 10 may correspond to the sampling point sp3_a of FIG. 3, and a signal in which a previous signal prv_o_a and a current signal curr_s_a of FIG. 10 overlap each other may be the received signal fr_a at the sampling point sp3_a of FIG. 3.

The previous signals prv_o_a, prv_s_a, and prv_e_a of FIG. 10 are single-bit responses to a binary level "1" in an odd mode, a static mode, and an even mode, respectively. For clear illustration of the signals, binary data before and after the binary level "1" is assumed to have a level "0."

The current signals curr_o_a, curr_s_a, and curr_e_a of FIG. 10 are single-bit responses to a binary level "0" in an odd mode, a static mode, and an even mode, respectively. For clear illustration of signals, binary data before and after the binary level "0" is assumed to have a level "1."

The sampling point org_a is a time point at which phase compensation of a sampling clock signal is not performed, and a sampling point comp_a is a time point at which phase compensation of the sampling clock signal has been performed.

In the static mode, that is, when no crosstalk-induced jitter is present, the sum of the first post-cursor of the previous signal that is 1 UI prior (i.e., 1 UI-previous signal) prv_s_a and the main cursor of the current signal curr_s_a is the intermediate level (IL). Because the binary level of the 1 UI-previous signal prv_s_a is 1, a first reference voltage VH is used to determine the current signal curr_s_a. The sum of the first post-cursor of the 1 UI-previous signal prv_s_a and the main cursor of the current signal curr_s_a is the intermediate level (IL), which is lower than the first reference voltage VH, and thus the current signal curr_s_a may be determined as the binary level "0."

In contrast, in the case of the even mode or the 2-even mode, that is, when crosstalk-induced jitter is present in one direction, the sum of the first post-cursor of the 1 UI-previous signal prv_e_a and the main cursor of the current signal curr_e_a is higher than the intermediate level (IL). Because the binary level of the 1 UI-previous signal prv_e_a is 1, the first reference voltage VH is used to determine the current signal curr_e_a. Because the sum of the first post-cursor of the 1 UI-previous signal prv_e_a and the main cursor of the current signal curr_e_a is lower than the first reference voltage VH, the current signal curr_e_a should be determined as a binary level "0," but a problem arises in that a margin fm1 is diminutively small. Depending on the communication environment, when the sum of the first post-cursor of the 1 UI-previous signal prv_e_a and the main cursor of the current signal curr_e_a becomes greater than the first reference voltage VH, an error may occur in decoding.

In the case of the odd mode or the 2-odd mode, that is, when crosstalk-induced jitter is present in a direction different from the one direction, the sum of the first post-cursor of the 1 UI-previous signal prv_o_a and the main cursor of the current signal curr_o_a is lower than the intermediate level (IL). Because the binary level of the 1 UI-previous signal prv_o_a is 1, the first reference voltage VH is used to determine the current signal curr_o_a. Because the sum of the first post-cursor of the 1 UI-previous signal prv_o_a and the main cursor of the current signal curr_o_a is sufficiently lower than the first reference voltage VH, there is no problem in deciding on the binary level of the current signal curr_o_a as '0'. Rather, a margin that is greater than that in the static mode may be obtained.

As described above, in the case of a falling transition, a worst-case scenario where compensation is to be performed occurs in the even mode or in the 2-even mode.

In accordance with the present embodiment, the controller 190 may compensate for crosstalk-induced jitter by adjusting the phase of the sampling clock signal. Referring to FIG. 10, the controller 190 may output a sampling clock signal CLK_comp_a having a compensated phase PH1 compared to a sampling clock signal CLK_org_a. Here, it can be seen that, at the phase-changed sampling point comp_a, the even mode or the 2-even mode may obtain a sufficient margin fm2. Because the static mode and the odd mode may have a greater margin, no problem is present.

Therefore, after compensation, the probability of a decoding error occurring due to crosstalk-induced jitter in all modes may be decreased.

Figure 11:
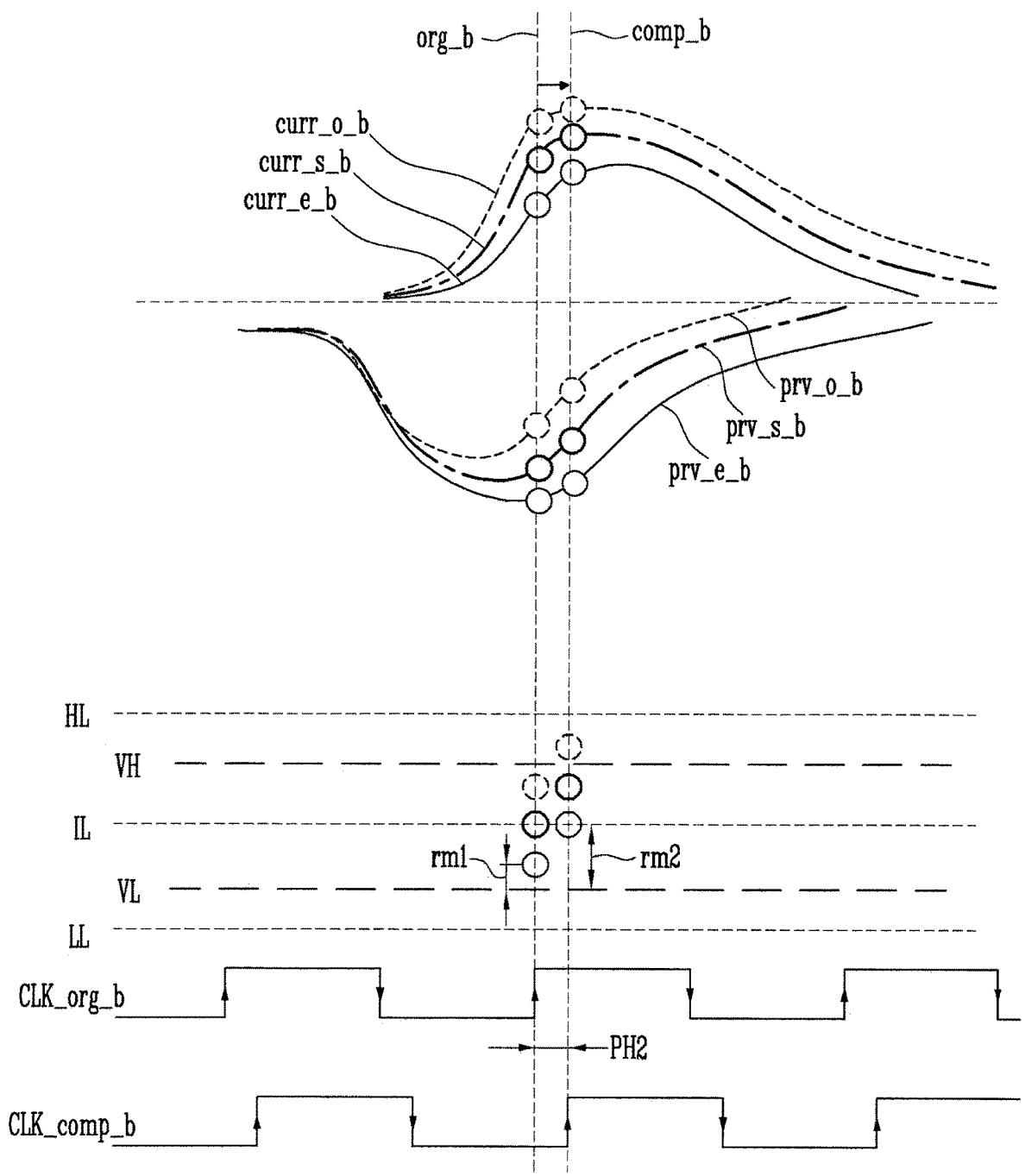
FIG. 11 is a diagram illustrating an effect that is obtained when the phase of a sampling clock signal is changed, according to an embodiment of the present disclosure.

FIG. 11 is a diagram illustrating an effect that is obtained when the phase of a sampling clock signal is changed, according to an embodiment of the present disclosure.

Referring to FIG. 11, a case where a 1 UI-previous signal has a binary level "0" and a current signal has a binary level "1" is conceptually illustrated. That is, the present case indicates a rising transition. Signals illustrated in FIG. 11 are not actual signals, and responses to respective pieces of binary data are conceptually separated and exaggeratedly illustrated for easy understanding. For example, a sampling point org_b of FIG. 11 may correspond to the sampling point sp2_a of FIG. 3, and a signal in which a previous signal prv_o_b and a current signal curr_s_b of FIG. 11 overlap each other may be the received signal fr_a at the sampling point sp2_a of FIG. 3.

The previous signals prv_o_b, prv_o_b, and prv_e_b of FIG. 11 are single-bit responses to a binary level "0" in an odd mode, a static mode, and an even mode, respectively. For clear illustration of signals, binary data before and after the binary level "0" is assumed to have a level "1."

The current signals curr_o_b, curr_s_b, and curr_e_b of FIG. 11 are single-bit responses to a binary level "1" in an odd mode, a static mode, and an even mode, respectively. For clear illustration of signals, binary data before and after the binary level "1" is assumed to have a level "0."

The sampling point org_b is a time point at which phase compensation of a sampling clock signal is not performed, and a sampling point comp_b is a time point at which phase compensation of the sampling clock signal has been performed.

In the static mode, that is, when no crosstalk-induced jitter is present, the sum of the first post-cursor of the 1 UI-previous signal prv_o_b and the main cursor of the current signal curr_s_b is at the intermediate level (IL). Because the binary level of the 1 UI-previous signal prv_o_b is 0, a second reference voltage VL is used to determine the current signal curr_s_b. The sum of the first post-cursor of the 1 UI-previous signal prv_s_b and the main cursor of the current signal curr_s_b is the intermediate level (IL), which is higher than the second reference voltage VL, and thus the current signal curr_s_b may be determined as the binary level "1."

In contrast, in the case of the even mode or the 2-even mode, that is, when crosstalk-induced jitter is present in one direction, the sum of the first post-cursor of the 1 UI-previous signal prv_e_b and the main cursor of the current signal curr_e_b is lower than the intermediate level (IL). Because the binary level of the 1 UI-previous signal prv_e_b is 0, the second reference voltage VL is used to determine the current signal curr_e_b. Because the sum of the first post-cursor of the 1 UI-previous signal prv_e_b and the main cursor of the current signal curr_e_b is higher than the second reference voltage VL, the current signal curr_e_b should be determined as a binary level "1." However, a problem arises in that a margin rm1 is diminutively small. Depending on the communication environment, when the sum of the first post-cursor of the 1 UI-previous signal prv_e_b and the main cursor of the current signal curr_e_b becomes less than the second reference voltage VL, an error may occur in decoding.

In the case of the odd mode or the 2-odd mode, that is, when crosstalk-induced jitter is present in a direction different from the one direction, the sum of the first post-cursor of the 1 UI-previous signal prv_o_b and the main cursor of the current signal curr_o_b is higher than the intermediate level (IL). Because the binary level of the 1 UI-previous signal prv_o_b is 0, the second reference voltage VL is used to determine the current signal curr_o_b. Because the sum of the first post-cursor of the 1 UI-previous signal prv_o_b and the main cursor of the current signal curr_o_b is sufficiently higher than the second reference voltage VL, there is no problem in deciding on the binary level of the current signal curr_o_b as "1." Rather, a margin that is greater than that in the static mode may be obtained.

As described above, in the case of a rising transition, a worst-case scenario where compensation is to be performed is the case of the even mode or the 2-even mode.

In accordance with the present embodiment, the controller 190 may compensate for crosstalk-induced jitter by adjusting the phase of the sampling clock signal. Referring to FIG. 11, the controller 190 may output a sampling clock signal CLK_comp_b having a compensated phase PH2 compared to a sampling clock signal CLK_org_b. Here, it can be seen that, at the phase-changed sampling point comp_b, the even mode or the 2-even mode may obtain a sufficient margin rm2. Because the static mode and the odd mode may have a greater margin, no problem is present.

Therefore, after compensation, the probability of a decoding error occurring due to crosstalk-induced jitter in all modes may be decreased.

In the case of the falling transition in FIG. 10 and the rising transition of FIG. 11, it can be seen that, even if phase correction is performed in the same direction, there is no problem in securing a margin fm2 or rm2. Therefore, when a rising transition time and a falling transition time are identical to each other, sufficient effect may be obtained if compensation according to the described embodiments is performed. A compensation method for this will be described later with reference to FIG. 12.

On the other hand, in an example, when a rising transition time and a falling transition time are different from each other, compensation according to the present embodiment may be performed on a slower transition of the rising transition and the falling transition. Even when compensation is performed on the slower transition, a faster transition may further secure a margin from the corresponding reference voltage, thus sufficiently solving the problem of a decoding error. A compensation method for this will be described in detail later with reference to FIG. 13.

Although, in FIGS. 10 and 11, sampling has been described as being performed in response to the rising transition of a sampling clock signal, sampling may be performed in response to the falling transition of the sampling clock signal depending on products. Further, when current integral-type sampling is applied depending on products, the transition points of clock signals CLK_org_a, CLK_comp_a, CLK_org_b, and CLK_comp_b may lead the sampling points org_a, comp_a, org_b, and comp_b so as to secure acquisition time.

Figure 12:
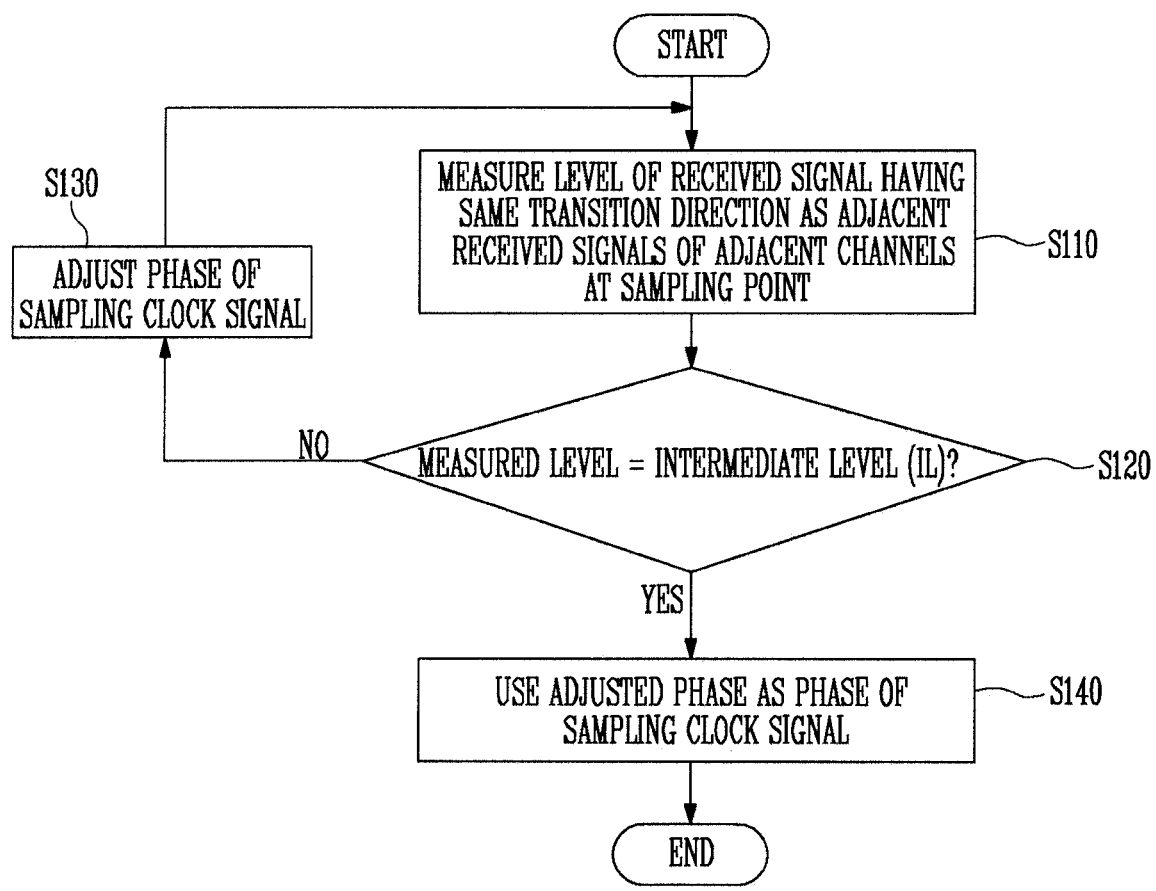
FIG. 12 is a flowchart illustrating a compensation method according to an embodiment of the present disclosure.

FIG. 12 is a diagram illustrating a compensation method according to an embodiment of the present disclosure.

The compensation method according to the present embodiment may be performed using a decoder 120 and a controller 190a that are included in a receiver 10a that is coupled to a transmitter 9a through a plurality of channels CH1 and CH2. The compensation method according to the present embodiment may also be performed using a decoder 120 and a controller 190b that are included in a receiver 10b that is coupled to a transmitter 9b through a plurality of channels CH1, CH2, and CH3. Hereinafter, a description will be made using the latter case, but those skilled in the art will be able to apply the present embodiment to the former case.

The transmitter 9b applies signals having the same transition direction to a target channel CH2 and to adjacent channels CH1 and CH3 in a compensation period.

First, the controller 190b measures the level of a received signal having the same transition direction as adjacent received signals of the adjacent channels CH1 and CH3 at a sampling point at S110.

Next, the controller 190b determines whether the measured level is an intermediate level (IL) at S120, and adjusts the phase of a sampling clock signal if the measured level is not an intermediate level (IL) at S130. The transition direction of the signal transmitted from the transmitter 9b is previously known information, and the direction of crosstalk-induced jitter depending on the transition direction may be predicted, and thus the phase of the sampling clock signal may be gradually moved in the predicted direction.

When the level measured by repeating this procedure falls within an allowable error range of the intermediate level (IL), the controller 190b may use the adjusted phase as the phase of the sampling clock signal at S140.

The effect thereof has been described above with reference to FIGS. 10 and 11.

Figure 13:
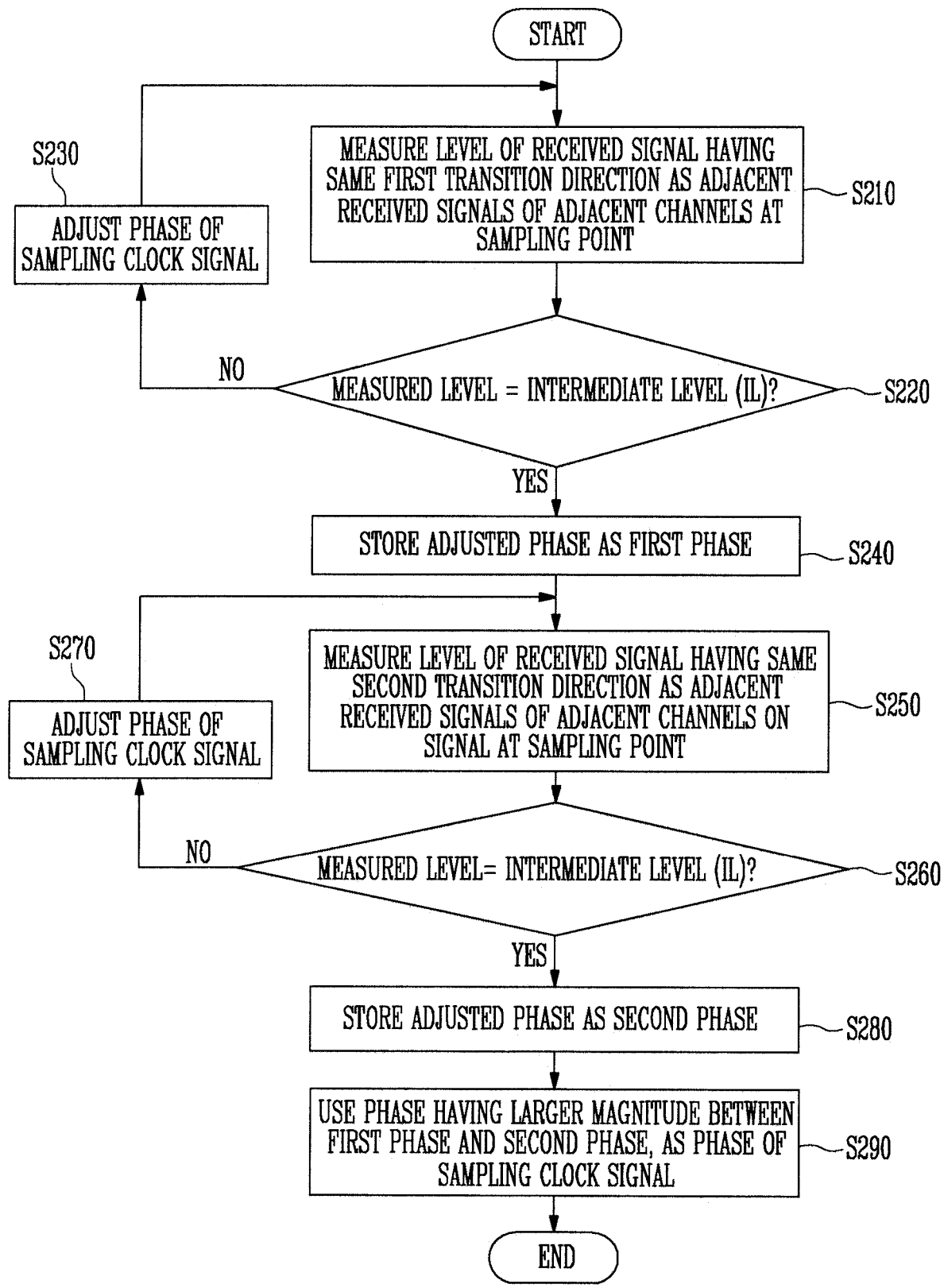
FIG. 13 is a flowchart illustrating a compensation method according to an embodiment of the present disclosure.

FIG. 13 is a diagram illustrating a compensation method according to an embodiment of the present disclosure.

The compensation method according to the present embodiment may be performed using a decoder 120 and a controller 190a that are included in a receiver 10a that is coupled to a transmitter 9a through a plurality of channels CH1 and CH2. The compensation method according to the present embodiment may also be performed using a decoder 120 and a controller 190b that are included in a receiver 10b that is coupled to a transmitter 9b through a plurality of channels CH1, CH2, and CH3. Hereinafter, a description will be made using the latter case, but those skilled in the art will apply the present embodiment to the former case.

The transmitter 9b applies signals having the same first transition direction to a target channel CH2 and to adjacent channels CH1 and CH3 in a compensation period.

First, the controller 190b measures the level of a received signal having the same first transition direction as adjacent received signals of the adjacent channels CH1 and CH3 at a sampling point at S210.

Next, the controller 190b may determine whether the measured level is an intermediate level (IL) at S220, and adjusts the phase of a sampling clock signal when the measured level is not an intermediate level (IL) at S230. The first transition direction of the signal transmitted from the transmitter 9b is previously known information, and the direction of crosstalk-induced jitter depending on the first transition direction may be predicted, and thus the phase of the sampling clock signal may be gradually moved in the predicted direction.

When the level measured by repeating this procedure falls within an allowable error range of the intermediate level (IL), the controller 190b may use the adjusted phase as a first phase at S240.

Then, the transmitter 9b applies signals having the same second transition direction to the target channel CH2 and the adjacent channels CH1 and CH3. Here, the second transition direction may be a direction that is opposite to the first transition direction.

The controller 190b may measure the level of a received signal having the same second transition direction as adjacent received signals of the adjacent channels CH1 and CH3 on signal at the sampling point at S250.

Next, the controller 190b determines whether the measured level is an intermediate level (IL) at S260, and adjusts the phase of the sampling clock signal if the measured level is not an intermediate level (IL) at S270. The second transition direction of the signal transmitted from the transmitter 9b is previously known information, and the direction of crosstalk-induced jitter depending on the second transition direction may be predicted, and thus the phase of the sampling clock signal may be gradually moved in the predicted direction.

When the level measured by repeating this procedure falls within an allowable error range of the intermediate level (IL), the controller 190b may use the adjusted phase as a second phase at S280.

Finally, the controller 190b may use the phase having a larger magnitude between the first phase and the second phase as the phase of the sampling clock signal at S290. The effect thereof has been described above with reference to FIGS. 10 and 11.

The receiver and the compensation method using the receiver according to the present disclosure may reduce or minimize the influence of crosstalk-induced jitter at a receiving stage.

While various exemplary embodiments have been described above, those skilled in the art will appreciate that various modifications, additions and substitutions are possible, without departing from the scope and spirit of the invention.

Therefore, the embodiments disclosed in this specification are only for illustrative purposes rather than limiting the technical spirit of the present disclosure. The scope of the present disclosure must be defined by the accompanying claims, with equivalents thereof to be included.

What is claimed is:

1. A receiver coupled to a transmitter through a plurality of channels, the receiver comprising:
   a decoder configured to sample a received signal of a corresponding channel of the channels at a sampling point; and
   a controller configured to:
   provide to the decoder a sampling clock signal for determining the sampling point;
   measure a level of the received signal having a transition direction that is identical to that of an adjacent received signal of an adjacent channel of the channels at the sampling point, during a compensation period; and
   adjust a phase of the sampling clock signal such that the measured level is at an intermediate level among variable levels of the received signal, during the compensation period.

2. The receiver according to claim 1, wherein the controller is further configured to, during the compensation period:
   measure the level of the received signal having a first transition direction that is identical to that of the adjacent received signal of the adjacent channel at the sampling point;
   store a phase of the sampling clock signal, which appears when the measured level is the intermediate level, as a first phase;
   measure the level of the received signal having a second transition direction that is identical to that of the adjacent received signal of the adjacent channel at the sampling point;
   store a phase of the sampling clock signal, which appears when the measured level is the intermediate level, as a second phase; and use either the first phase or the second phase that has a larger magnitude as the phase of the sampling clock signal.

3. The receiver according to claim 2, wherein the first transition direction and the second transition direction are different from each other.

4. The receiver according to claim 1, wherein the adjacent channel is one of two adjacent channels that are most adjacent to the corresponding channel, and wherein, during the compensation period, adjacent received signals having an identical transition direction are simultaneously applied to the two adjacent channels.

5. The receiver according to claim 1, wherein the decoder comprises:

a first comparator configured to provide a logic value by comparing the received signal with a first reference voltage in response to the sampling clock signal;

a second comparator configured to provide a logic value by comparing the received signal with a second reference voltage in response to the sampling clock signal; and a multiplexer configured to output one of the logic values provided by the first comparator and the second comparator as current data.

6. The receiver according to claim 5, wherein the multiplexer is configured to:

select one of the logic values provided by the first comparator and the second comparator based on previous data occurring one unit interval (1 UI) before the current data; and output the selected one of the logic values as the current data.

7. The receiver according to claim 6, wherein the first reference voltage has an intermediate value that is between the intermediate level and a highest level among the variable levels of the received signal, and wherein the second reference voltage has an intermediate value that is between the intermediate level and a lowest level among the variable levels of the received signal.

8. The receiver according to claim 7, wherein the first comparator is configured to:

when the received signal is higher than the first reference voltage, provide a high-level logic value; and when the received signal is lower than the first reference voltage, provide a low-level logic value, and wherein the second comparator is configured to:

when the received signal is higher than the second reference voltage, provide a high-level logic value; and when the received signal is lower than the second reference voltage, provide a low-level logic value.

9. The receiver according to claim 8, wherein:

when an output value of the multiplexer is a high-level logic value, a binary level of the current data is 1; and when the output value of the multiplexer is a low-level logic value, a binary level of the current data is 0.

10. The receiver according to claim 1, wherein the received signal is a duo-binary signal.

11. The receiver according to claim 1, wherein each of the plurality of channels is designed as a low-pass filter.

12. A compensation method performed using a decoder and a controller in a receiver that is coupled to a transmitter through a plurality of channels, the compensation method comprising:

measuring a level of a received signal of a corresponding channel of the channels having a transition direction that is identical to that of an adjacent received signal of an adjacent channel of the channels at a sampling point; and adjusting a phase of a sampling clock signal for determining the sampling point such that the measured level is an intermediate level among variable levels of the received signal.

13. The compensation method according to claim 12, wherein the adjacent channel is one of two adjacent channels of the channels that are most adjacent to a channel to which the received signal is applied, and wherein adjacent received signals, which include the adjacent received signal, have an identical transition direction and are simultaneously applied to the two adjacent channels.

14. The compensation method according to claim 12, wherein the received signal is a duo-binary signal.

15. The compensation method according to claim 12, wherein each of the plurality of channels is designed as a low-pass filter.

16. A compensation method performed using a decoder and a controller in a receiver that is coupled to a transmitter through a plurality of channels, the compensation method comprising:

measuring a level of a received signal of a corresponding channel of the channels having a first transition direction that is identical to that of an adjacent received signal of an adjacent channel of the channels at a sampling point;

storing, as a first phase, a phase of a sampling clock signal for determining the sampling point such that the measured level is an intermediate level among variable levels of the received signal;

measuring a level of the received signal having a second transition direction that is identical to that of the adjacent received signal of the adjacent channel at the sampling point;

storing, as a second phase, a phase of the sampling clock signal appearing when the measured level is the intermediate level; and using the first phase or the second phase having a larger magnitude as the phase of the sampling clock signal.

17. The compensation method according to claim 16, wherein the first transition direction and the second transition direction are different from each other.

* * * * *